Patented Aug. 21, 1951

2,564,714

UNITED STATES PATENT OFFICE 2,564,714

INSECT REPELLENTS

Melvin S. Newman, Columbus, Ohio, assignor to the United States of America as represented by the Secretary of the Army No Drawing. Application December 29, 1948, Serial No. 68,041

8 Claims. (Cl. 167—32)

This invention relates to insect repellents.

I have found that the application of 3,4-dihydro-5,8-dimethylnaphthalenone-1 (a compound having the structural formula

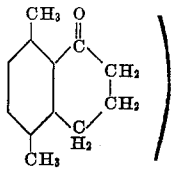

to the human skin or to a fabric affords effective protection against insect bites, by repelling insects, particularly Aedes aegypti.

A number of tests to measure the repellency of 3,4 - dihydro - 5,8 - dimethyl - naphthalenone-1 against Aedes aegypti was conducted by smearing the compound on the arms of test personnel, who then thrust their arms into cages containing Aedes aegypti. The arms were exposed for 30-minute intervals at 3 minutes each until the first insect bite.

Tests to measure the repellency of 3,4-dihydro-5,8-dimethyl-naphthalenone-1 impregnated fabrics against Aedes aegypti were conducted by uniformly impregnating mercerized cotton hose with the compound at a rate equivalent to 3.3 gms. per sq. ft., drawing the dried hose over the arms of test personnel, who then thrust their covered arms into cages containing Aedes aegypti for 1 to 2 minutes. If no bites or less than 5 bites were received, the tests were repeated each successive day until 5 or more bites during one exposure were received.

It was found that the application of 3,4-dihydro-5,8-dimethyl - naphthalenone - 1 affords protection against Aedes aegypti for an average of 248 minutes. Against Anopheles quadrimaculatus, an average repellency time of 79 minutes was noted in analogous tests.

It was found that fabric impregnated with 3,4-dihydro - 5,8 - dimethyl - naphthalenone - 1 remained repellent to Aedes aegypti for over 10 successive days.

For ease of application to the skin, 3,4-dihydro-5,8-dimethyl-naphthalenone-1 may be incorporated in a suitable inert liquid or solid carrier such as mineral oil, alcohol, petrolatum, etc. For ease and uniformity of application to the fabric, 3,4-dihydro-5,8-dimethyl-naphthalenone-1 may be applied to the fabric in an inert solvent, such as alcohol, ether, etc.

Having thus described my invention, I claim:

1. An insect-repellent fabric comprising fabric impregnated with 3,4-dihydro-5,8-dimethylnaphthalenone-1.

2. A composition for imparting insect-repellency to a fabric, comprising 3,4-dihydro-5,8-dimethyl-naphthalenone-1 in an inert non-gaseous organic solvent.

3. An insect repellent composition comprising 3,4-dihydro-5,8-dimethyl-naphthalenone-1 in a non-gaseous inert organic carrier.

4. An insect repellent composition comprising 3,4-dihydro-5,8-dimethyl-naphthalenone-1 in alcohol.

5. An insect repellent composition comprising 3,4-dihydro-5,8-dimethyl - naphthalenone - 1 in ether.

6. An insect repellent composition comprising 3,4-dihydro-5,8-dimethyl - naphthalenone - 1 in mineral oil.

7. An insect repellent composition comprising 3,4-dihydro-5,8-dimethyl - naphthalenone - 1 in petrolatum.

8. A process of repelling insects comprising applying 3,4-dihydro-5,8-dimethyl-naphthalenone-1 to the region from which the insects are to be repelled.

MELVIN S. NEWMAN.

REFERENCES CITED

The following references are of record in the file of this patent:

UNITED STATES PATENTS

| Number | Name | Date |
|---|---|---|
| 2,283,471 | Swaine | May 19, 1942 |
| 2,348,976 | Hyman | May 16, 1944 |
| 2,368,667 | Ladd | Feb. 6, 1945 |

FOREIGN PATENTS

| Number | Country | Date |
|---|---|---|
| 377,587 | Germany | June 22, 1923 |